(12) United States Patent
Tan et al.

(10) Patent No.: US 11,253,101 B2
(45) Date of Patent: Feb. 22, 2022

(54) KITCHEN APPLIANCE AND COOKING MONITORING METHOD

(71) Applicant: KONINKLIJKE PHILIPS N.V., Eindhoven (NL)

(72) Inventors: Jingwei Tan, Eindhoven (NL); Jiani Tang, Eindhoven (NL); Feng Tian, Eindhoven (NL); Xiaoyun Kui, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 191 days.

(21) Appl. No.: 16/068,911

(22) PCT Filed: Jan. 9, 2017

(86) PCT No.: PCT/EP2017/050292
§ 371 (c)(1),
(2) Date: Jul. 10, 2018

(87) PCT Pub. No.: WO2017/121691
PCT Pub. Date: Jul. 20, 2017

(65) Prior Publication Data
US 2019/0021546 A1 Jan. 24, 2019

(30) Foreign Application Priority Data

Jan. 14, 2016 (WO) ............... PCT/CN2016/070900
Apr. 26, 2016 (EP) ..................... 16167085

(51) Int. Cl.
*A47J 36/32* (2006.01)
*A47J 27/00* (2006.01)
(Continued)

(52) U.S. Cl.
CPC ............... *A47J 36/32* (2013.01); *A23L 5/13* (2016.08); *A47J 27/004* (2013.01); *A47J 27/04* (2013.01);
(Continued)

(58) Field of Classification Search
CPC .......... A47J 36/32; A47J 27/004; A47J 27/04; A47J 2027/043; A47J 37/1266;
(Continued)

(56) References Cited

U.S. PATENT DOCUMENTS

| 3,573,431 A | 4/1971 | Tyler |
| 4,847,099 A | 7/1989 | Elinsky |
(Continued)

FOREIGN PATENT DOCUMENTS

| CN | 1223356 A | 7/1999 |
| CN | 1496665 A | 5/2004 |
(Continued)

*Primary Examiner* — Brian W Jennison
(74) *Attorney, Agent, or Firm* — Schott, P.C.

(57) ABSTRACT

A kitchen appliance is disclosed for cooking a meat product. The kitchen appliance includes a heating element adapted to heat a medium for transferring heat to the meat product, a sensor for detecting loss of water from a contact surface of the meat product with the medium, and a controller conductively coupled to the sensor. The controller processes a sensor signal produced by the sensor, and generates a control signal indicative of the meat product reaching a defined cooking state in response to the processed sensor signal being indicative of a loss of water associated with the desired cooking state from the contact surface of the meat product.

15 Claims, 6 Drawing Sheets

(51) Int. Cl.
*A47J 27/04* (2006.01)
*H05B 1/02* (2006.01)
*H05B 6/06* (2006.01)
*A23L 5/10* (2016.01)

(52) U.S. Cl.
CPC ......... *H05B 1/0258* (2013.01); *H05B 1/0261* (2013.01); *H05B 6/062* (2013.01); *A23V 2002/00* (2013.01); *A47J 2027/043* (2013.01); *H05B 2213/07* (2013.01)

(58) Field of Classification Search
CPC .... H05B 1/0258; H05B 1/0261; H05B 1/062; H05B 6/062
See application file for complete search history.

(56) References Cited

U.S. PATENT DOCUMENTS

| | | | |
|---|---|---|---|
| 6,034,359 A | 3/2000 | Busch | |
| 6,268,012 B1 * | 7/2001 | Sikora | A23B 7/0205 426/465 |
| 6,753,027 B1 | 6/2004 | Greiner | |
| 7,102,107 B1 * | 9/2006 | Chapman | F24C 7/082 219/492 |
| 8,609,168 B2 | 12/2013 | Ceravalls | |
| 2003/0127451 A1 * | 7/2003 | Lile | A47J 37/1266 219/497 |
| 2009/0188396 A1 * | 7/2009 | Hofmann | H05B 6/6452 99/342 |
| 2013/0084369 A1 * | 4/2013 | Smrke | G05D 23/27535 426/231 |
| 2016/0349230 A1 * | 12/2016 | Kirkjan | G01N 33/025 |

FOREIGN PATENT DOCUMENTS

| | | |
|---|---|---|
| CN | 101126934 B | 12/2012 |
| DE | 102009023761 A1 | 12/2010 |
| EP | 2590473 A1 | 5/2013 |
| JP | H10-79290 A | 3/1998 |
| WO | 2015185404 A1 | 12/2015 |

\* cited by examiner

KITCHEN APPLIANCE AND COOKING MONITORING METHOD

This application is the U.S. National Phase application under 35 U.S.C. § 371 of International Application No. PCT/EP2017/050292, filed on Jan. 9, 2017, which claims the benefit of International Application No. PCT/CN2016/070900 filed on Jan. 14, 2016 and International Application No. 16167085.6 filed Apr. 26, 2016. These applications are hereby incorporated by reference herein.

FIELD OF THE INVENTION

The present invention relates to a kitchen appliance for cooking a meat product, comprising a heating element adapted to heat a medium for transferring heat to the meat product.

The present invention further relates to a method of monitoring cooking of a meat product with such a kitchen appliance.

BACKGROUND OF THE INVENTION

In the field of food preparation, there is an increasing desire for intelligent appliances that can control the cooking process of a food product in order to obtain a food product that is cooked according to specific requirements. For example, an appliance that can control the cooking of food product such that essential nutrients within the food product, e.g. carbohydrates, fats, proteins, vitamins, minerals and so on, are preserved as much as possible and not lost, e.g. thermally decomposed, during the cooking process. The intelligent appliance should exclude human error from the cooking process, e.g. a person cooking the food not cooking it for the correct period of time and/or not cooking it at the right temperature, which can lead to suboptimally prepared food from which nutrients have been lost and/or which does not have the desired taste or texture, e.g. undercooked or overcooked food products.

For example, when frying or roasting a meat product, it may be desirable to perform such a cooking process at temperatures in excess of 130° C., above which Maillard reactions will take place in particular in the surface regions of the meat product, which reactions take place between amino acids and reducing sugars and cause the browning and flavouring of the meat product. However, at such high temperatures some nutrients such as vitamin B and C become prone to thermal degradation and may be lost from the meat product. Therefore, it is desirable to limit the exposure of the meat product to such elevated temperatures in order to minimize the losses of such temperature-labile nutrients. On the other hand, to avoid the risk of food poisoning due to bacteria in the meat surviving the cooking process, the entire meat product should reach a temperature at which the meat product is considered safe to eat, e.g. about 50° C. for beef or about 60° C. for pork. This typically specifically applies to the core of the meat product, as the heat entering the meat product through its surface regions may have difficulty reaching the core of the meat product due to the high amounts of water in the surface regions of the meat.

It is possible to prepare properly cooked meat products with high nutrient contents by cooking the meat product sous vide. In this process, the meat product is placed in a vacuum-sealed plastic bag and cooked in a water bath for several hours at a temperature of about 50-70° C. after which the meat product may be briefly fried or roasted to flavor the meat product by triggering the above mentioned Maillard reactions in the contact surface of the meat product. This retains high moisture and nutrient levels in the meat product whilst ensuring that the meat product is evenly cooked throughout. However, sous vide cooking is rather time-consuming and as such inconvenient for routine preparation of a meat product where time is a scarce resource for a consumer, e.g. on a weekday evening after work.

It is known to control a cooking process using cooking process sensors. For example, U.S. Pat. No. 6,753,027 B1 discloses a method of controlling the cooking process in which at least two temperature values are picked up by a cooking process sensor which is adapted to be stuck at least partly into food to be cooked. Specific parameters of cooking food and/or cooking utensils are determined via the thermokinetics of the temperature values registered, and the specific cooking food and/or cooking utensil parameters determined are utilised for controlling the cooking process. However, such a control process is sensitive to human error, for example when the cooking process sensor is not correctly inserted into the food to be cooked.

SUMMARY OF THE INVENTION

The present invention seeks to provide a kitchen appliance for cooking a meat product that can control the cooking of the meat product more robustly.

The present invention further seeks to provide a method of monitoring cooking of a meat product with such a kitchen appliance.

According to an aspect, there is provided a kitchen appliance for cooking a meat product, comprising a heating element adapted to heat a medium for transferring heat to the meat product; a sensor for detecting loss of water from a contact surface of the meat product with the medium; and a controller conductively coupled to the sensor and adapted to process a sensor signal produced by the sensor; and generate a control signal indicative of the meat product reaching a defined cooking state in response to the processed sensor signal being indicative of a loss of water associated with the defined cooking state from the contact surface of the meat product.

The present invention is based on the insight that the progress of Maillard reactions, e.g. the browning and/or searing of meat can be monitored by monitoring parameters associated with the water loss from the contact surface of the meat with the medium heating the meat, e.g. a thermally conductive solid surface such as a metal surface, e.g. a flat metal surface, a griddled metal surface, a grill, and so on, or a fluid surface such as hot air. It has been found that certain values of such parameters and/or the progression of such values are indicative of key stages within the cooking process of the meat product, such that the detection of such values or progression thereof may be used to generate a control signal for controlling the cooking process, for example to adjust the cooking temperature of the meat product and/or to trigger the flipping of the meat product such that a different context surface of the meat product is exposed to the medium.

In an embodiment, the kitchen appliance further comprises a sensory output device, wherein the controller is adapted to control the sensory output device with the control signal, said control signal causing the sensory output device to generate a warning signal. Such a warning signal may be intended for a user of the kitchen appliance to alert the user that an adjustment to cooking process of the meat product is required, such as an adjustment of the cooking temperature and/or the flipping of the meat product. The sensory output device may be at least one of a display device, a light emitting diode and a loudspeaker. The sensory output device may be a stand-alone of the device or may form part of a user interface of the kitchen appliance.

In an embodiment, the kitchen appliance further comprises a rotatable holding device for holding the meat product, wherein the controller is adapted to control the rotatable holding device with the control signal to cause a rotation of the meat product. This obviates the need for the user of the kitchen appliance to manually rotate the meat product, thus further reducing the risk of user error and increasing the robustness of the operability of the kitchen appliance.

Preferably, the sensor is a temperature sensor arranged to contact a contact surface of the meat product with the medium. A temperature sensor is particularly well-suited to monitor the loss of water from the contact surface of the meat product, as such a loss of water is typically associated with a marked increase in the temperature of the contact surface and/or medium.

The controller may be adapted to determine a rate of temperature change from a series of sensor signals produced by the temperature sensor and to generate the control signal if said rate of temperature change exceeds a defined threshold. By evaluation of a series of sensor signals produced by the temperature sensor at different points in time, e.g. a series of contiguous sensor signals, the controller can detect a sudden rapid increase in the monitored temperature as indicated by the temperature rate change exceeding a defined threshold, i.e. a critical rate change. Such a sudden rapid increase in the monitored temperature is typically indicative of the loss of water from the contact region of the meat product and is therefore particularly suitable to detect the progression of the cooking process of the meat product to a desired stage of the cooking process, e.g. the progression of the Maillard reactions to a desired level.

Alternatively or additionally, the controller may be adapted to compare a temperature derived from a sensor signal produced by the temperature sensor with a defined temperature and to generate the control signal if said temperature derived from the sensor signal at least matches the defined temperature. The loss of water from the contact region of the meat product may also be derived from the monitored temperature reaching a particular value, e.g. a value of about 300° C., which again may be indicative of the cooking process of the meat product reaching a desired stage of the cooking process.

In an alternative embodiment, the sensor is a sound sensor in the vicinity of the medium. This embodiment is based on the insight that the release of water from the contact surface of the meat product with the medium causes a characteristic sizzling sound, the level of which may be indicative of the amount of water associated with the defined cooking state being released from the meat product.

The controller may be adapted to compare a sound signature of a sensor signal produced by the sound sensor with a defined sound signature and to generate the control signal if the sound signature of the sensor signal matches the defined sound signature. For example, the controller may determine a sizzling intensity level in the sound signature and compare the determined sizzling intensity level with a defined sizzling intensity threshold to determine if the loss of water from the contact surface of the meat product has reached a value indicative of the cooking process of the meat product reaching a desired stage of the cooking process.

In an embodiment, the controller is adapted to control the heating element in response to the processed sensor signal being indicative of the loss of water associated with the defined cooking state from the contact surface of the meat product. In this manner, the further cooking of the meat product may be accurately controlled in order to achieve a cooked meat product having the desired cooking characteristics and nutrient preservation levels.

The controller may be adapted to control the heating element such as to reduce the temperature of the heat transfer surface in response to the processed sensor signal being indicative of the loss of water associated with the defined cooking state from the contact surface of the meat product. In this manner, once it is determined that the outer regions of the meat product have been cooked to desired degree, the remainder of the meat product may be more slowly cooked at a lower heat for example to avoid excessive loss of nutrients during the remainder of the cooking process.

The controller may be adapted to switch off the heating element after a determined amount of time in response to the processed sensor signal indicative of the loss of water associated with the defined cooking state from the contact surface of the meat product. Once the outer regions of the meat product have been cooked to a desired degree, the remainder of the cooking process typically has a relatively constant duration in order to achieve a meat product having the desired degree of cooking, which insight has been utilised in this embodiment by adapting to the controller to disable the heating element after this constant duration such that the meat product may be cooked to the desired degree of cooking in a highly automated fashion.

The medium may be at least one of a heat transfer surface in contact with the heating element or air-heated by the heating element.

The kitchen appliance may be one of a frying apparatus, a grill, an air frying apparatus, an oven and a multi-cooker.

According to another aspect, there is provided a method of monitoring cooking of a meat product, comprising heating a medium in thermal contact with the meat product for transferring heat to the meat product; generating a sensor signal with a sensor arranged to detect loss of water from a contact surface of the meat product with the medium; processing the sensor signal; and generating a control signal indicative of the meat product reaching a defined cooking state in response to the processed sensor signal being indicative of a loss of water associated with the defined cooking state from the contact surface of the meat product. Such a method facilitates the cooking of the meat product to a desired degree whilst minimizing loss of nutrients from the meat product.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
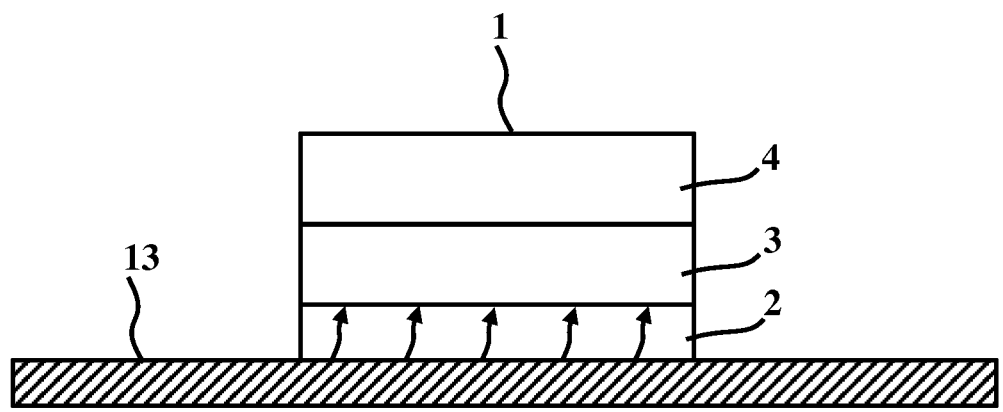
FIG. 1 schematically depicts different cooking zones inside a meat product during cooking.

It should be understood that the Figures are merely schematic and are not drawn to scale. It should also be understood that the same reference numerals are used throughout the Figures to indicate the same or similar parts.

FIG. 1 schematically depicts a meat product 1 during cooking by a medium 13, here a heated cooking surface. As shown in FIG. 1, when frying or roasting the meat product, three main zones 2, 3 and 4 may be identified in the meat product 1, which zones 2-4 result from the heat transmission from the medium 13 into the meat product 1 as indicated by the wavy arrows emanating from the medium 13.

Zone 2, which is the contact surface of the meat product 1 with the medium 13 is often referred to as the desiccation zone. In this zone, the water inside the meat product 1 is evaporated and the Millard reactions take place. This typically is the zone in the meat product 1 having the highest temperature during the cooking process of the meat product 1.

Zone 3 is often referred to as the boiling zone and is the zone bordering the desiccation zone. This zone is called the boiling zone because the temperature inside this zone reaches 100° C. such that the water inside this zone is boiled causing the generation of steam.

Zone 4 is often referred to as the conduction zone and is the zone bordering the boiling zone. In the conduction zone, fat within the meat product 1 is rendered and leaks out of the meat product. The channels created by this leaking process allow steam to escape from the boiling zone. The texture of the meat product 1 starts to change to a cooked texture at around 50° C. The meat product 1 in the conduction zone is poached in its own juices, and the temperature in this zone is well below the boiling point of water. Moreover, as muscle fibers conduct heat very slowly, the deep interior of the meat product 1 including the conduction zone is primarily warmed up by the indirect heat from steam and hot juices percolation up through the meat product 1.

For the avoidance of doubt, it is noted that in FIG. 1 the conduction zone 4 is shown as a surface zone of the meat product 1 for the sake of simplicity. It should be understood that the conduction zone 4 typically defines the core of the meat product 1, as is well-known per se. Also, it should be understood that the various zones 2-4 of the meat product 1 are not static and may change in size during the cooking of the meat product 1. In particular, the desiccation zone 2 will increase in size and the conduction zone 4 will reduce in size at prolonged cooking times.

The high temperatures in the desiccation zone 2 of the meat product 1 will cause the loss of significant amounts of temperature-labile nutrients, and may cause the formation of a carbonization layer on the meat product 1, both of which are undesirable. Therefore, it is desirable to keep the desiccation zone 2 as thin as possible and/or keep the boiling phase of the meat product 1 as short as possible whilst ensuring that the meat product 1 is properly cooked throughout. In this manner, a properly cooked meat product may be provided in which nutrient loss is largely avoided.

Figure 2:
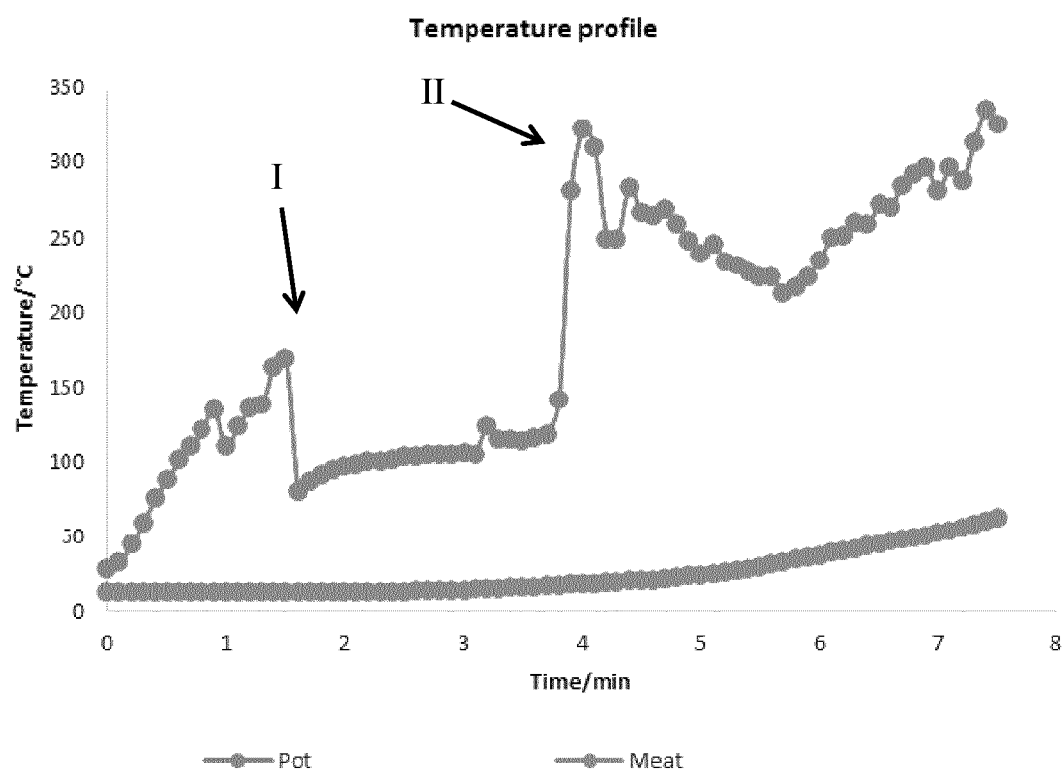
FIG. 2 schematically depicts a typical temperature profile of a meat cooking process in a kitchen appliance.

FIG. 2 schematically depicts a typical temperature profile as a function of time of the temperature of the medium 13, here a cooking pot (upper curve), and the meat product 1 (lower curve) during a frying process of the meat product 1. During this process, the medium 13 is heated up at t=0 min causing a gradual increase in the temperature of the medium 13. At approximately t=1 min, oil is added to the cooking pot, which causes a temporary drop in the temperature of the medium 13 due to the fact that heat is transferred from the medium 13 to the oil added to the cooking pot. At approximately t=1.5 min (labeled I), the oil has sufficiently heated up and the meat product 1 is brought into contact with the medium 13, causing a sharp drop in the temperature of the medium 13 due to the transfer of heat from the hot medium 13 to the cold meat product 1. For a period of approximately 2.5 minutes, the heat of the medium 13 stays at a relatively constant temperature. This is caused by the heat added to the medium 13 being substantially transferred to the meat product 1, causing the loss of water through evaporation from the desiccation zone of the meat product 1.

At the point in time at just before t=4 min (labeled II), a sharp increase in the temperature of the medium 13 is observed, which can be explained by the more or less complete loss of water from the desiccation zone of the meat product 1. As the water is mainly responsible for the heat transfer from the medium 13 to the meat product 1, the absence of significant amounts of water in the desiccation zone of the meat product 1 cause a reduction in heat transfer between the medium 13 and the meat product 1, which is reflected in the sudden increase in temperature of the medium 13. Moreover, this sudden increase in the temperature of the medium 13 can cause the boiling zone 3 of the meat product 1 to rapidly extend into the conduction zone 4. This sudden increase therefore is indicative of the searing of the meat product 1 and may be used as an indicator to flip the meat product 1, thereby minimizing the thickness of the desiccation zone of the meat product 1 due to the fact that the indicator may be generated in conjunction with this searing process. The cooking process may be continued at a lower heat until the meat product 1 has reached its desired temperature, e.g. about 50° Celsius, which is reached at t=about 8 minutes in the cooking process schematically depicted in FIG. 2.

Figure 3:
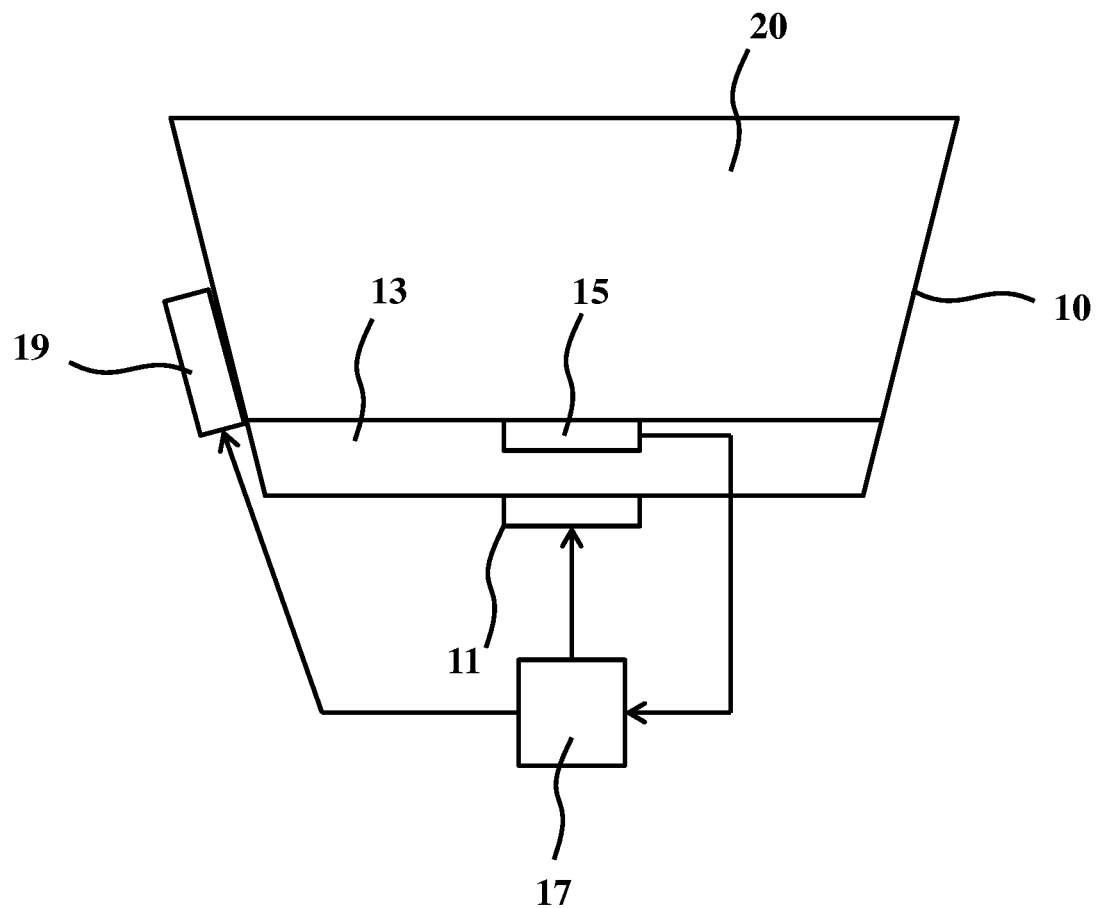
FIG. 3 schematically depicts a kitchen appliance according to an embodiment.

FIG. 3 schematically depicts a kitchen appliance 10 according to an embodiment of the present invention in which the reproducibility of the temperature profiles schematically depicted in FIG. 2 is utilized to control the cooking process of a meat product 1. The kitchen appliance 10 comprises a heating element 11 thermally coupled, e.g. in physical contact with, the medium 13, here a solid cooking surface. The solid cooking surface may be made of any suitable heat-conductive material, e.g. a metal or metal alloy surface, which surface may be coated with a coating layer such as a non-stick layer, e.g. a polytetrafluoroethylene (Teflon®) layer or the like.

The solid cooking surface 13 may be a closed surface having a flat or ribbed surface, e.g. a griddle surface, or may be an open surface such as a grill surface. In this embodiment, a closed surface is preferred. The solid cooking surface typically forms part of a compartment 20 of the kitchen appliance 10 in which the meat product 1 may be cooked, e.g. fried, grilled or griddled. The kitchen appliance 10 may further comprise a lid (not shown) for placement on the compartment 20 in order to create an enclosed space in which the meat product 1 may be cooked in order to retain heat and moisture within the enclosed space. The heating element 11 may be any suitable heating element and may be thermally coupled with any suitable region of the solid cooking surface. Preferably, the heating element 11 is in physical contact with a central region of the solid cooking surface in order to facilitate a symmetrical heat distribution across the solid cooking surface.

The kitchen appliance 10 further comprises a temperature sensor 15 in thermal contact with the solid cooking surface. In an embodiment, the temperature sensor 15 is integrated in the solid cooking surface. The temperature sensor 15 is typically arranged such that it senses the temperature of the solid cooking surface of the kitchen appliance 10. Any suitable temperature sensor may be used for this purpose. The temperature sensor 15 is preferably arranged in thermal contact with a region of the solid cooking surface most likely to receive the meat product 1, e.g. a central region of the solid cooking surface. In an embodiment, the temperature sensor 15 is integrated in a central region of the solid cooking surface.

The kitchen appliance 10 further comprises a controller 17 coupled to the temperature sensor 15 such that the controller 17 is adapted to process a sensor signal produced by the temperature sensor 15 to determine a temperature of the solid cooking surface of the kitchen appliance 10. In this manner, the controller 17 may monitor the temperature of the solid cooking surface of the kitchen appliance 10 in order to detect temperature behaviour indicative of the loss of water from the desiccation zone 2 of the meat product 1.

In an embodiment, the controller 17 may be configured to determine a rate of temperature increase of the solid cooking surface from a series of sensor signals produced by the temperature sensor at a different point in time. In a straightforward embodiment, the controller 17 is configured to determine the rate of temperature increase from the formula:

$$\Delta T/dt = (T_2 - T_1)/(t_2 - t_1)$$

In this formula, $T_1$ is a first temperature measured with the temperature sensor 15 at point in time $t_1$ and $T_2$ is a second temperature measured with the temperature sensor 15 at a later (next) point in time $t_2$. Obviously, more elaborate formulas in which more than two (subsequent) temperature measurements are considered may equally be applied. As such formulas are well-known per se, they are not explained in further detail for the sake of brevity only. The controller 17 may be adapted to evaluate the determined rate of temperature increase to determine if there is a sudden increase in the rate of temperature indicative of the substantially complete loss of water from the desiccation zone 2 of the meat product 1 as explained above in more detail with the aid of FIGS. 1 and 2. For example, the controller 17 may be adapted to compare the latest determined rate of temperature increase with a previously determined rate of temperature increase to determine if the rate of temperature increase exhibits acceleration characteristics indicative of the occurrence of the cooking event of the meat product 1 labelled II in FIG. 2. Alternatively, the controller 17 may be adapted to compare the latest determined rate of temperature increase against a defined threshold to determine if the rate of temperature increase exhibits acceleration characteristics indicative of the occurrence of the cooking event of the meat product 1 labelled II in FIG. 2.

Alternatively or additionally, the controller 17 may be adapted to compare the temperature derived from a sensor signal received from the temperature of sensor 15 against a defined critical temperature to determine if the solid cooking surface has reached a temperature indicative of the completion of the cooking event of the meat product 1 labelled II in FIG. 2. For example, the critical temperature may be defined as about 300° C. as a solid cooking surface reaching or exceeding this temperature is likely to be associated with a meat product 1 having reached the cooking stage labelled II in FIG. 2.

The controller 17 is further adapted to generate a control signal indicative of the meat product 1 reaching a defined cooking state, e.g. the cooking state labelled II in FIG. 2 in response to the processed sensor signal being indicative of the loss of water from the contact surface of the meat product, here upon detecting the temperature behaviour of the solid cooking surface indicative of the meat product 1 having reached this defined cooking state.

In FIG. 3, the kitchen appliance 10 further comprises a sensory output device 19 responsive to the control signal of the controller 17. In the context of the present application, a sensory output device is a device that can produce an output that can be detected by at least one of the senses of the human, e.g. an optical output, an audible output, and so on. Any suitable embodiment of such a sensory output device 19 may be contemplated. Non-limiting examples of suitable embodiments include a display device, a light emitting diode, a loudspeaker or combinations thereof. The sensory output device 19 in some embodiments may form part of a user interface of the kitchen appliance 10 through which a user can control the kitchen appliance. The control signal generated by the controller 17 causes the sensory output device 19 to generate a warning signal such as a warning message produced on a display device, a constantly or intermittently illuminated light emitting diode, a warning sound produced by a loudspeaker and so on to trigger a user to adjust the settings of the kitchen appliance 10 and/or flip the meat product 1 on the solid cooking surface.

In an embodiment, the controller 17 may be further adapted to control the heating element 11 of the kitchen appliance 10 in response to the sensor signal processed by the controller 17 being indicative of the loss of water from the contact surface of the meat product 1, here upon detecting the temperature behaviour of the solid cooking surface indicative of the meat product 1 having reached this defined cooking state. To this end, the controller 17 may generate a further control signal in response to the sensor signal processed by the controller 17 being indicative of the loss of water from the contact surface of the meat product 1, which further control signal controls the heating element 11. For example, the further control signal may cause a reduction in the heat transferred from the heat element 11 to the solid cooking surface of the kitchen appliance 10 in order to reduce the rate of cooking of the meat product 1. In particular, the controller 17 may be adapted to reduce the rate of cooking such that the desiccation zone 2 of the meat product 1 is not significantly extended during the remainder of the cooking process whilst ensuring that the meat product 1 is cooked throughout, i.e. reaches the desired temperature in the conduction zone 4. Alternatively or additionally, the controller 17 may be adapted to temporarily disable the heating element 11 in order to avoid overheating of the meat product 1, e.g. immediately after detection of a particular cooking event during the cooking of the meat product 1.

In an embodiment, the controller 17 additionally or alternatively may be adapted to disable, i.e. switch off, the heating element 11 after a defined period of time following the detection of a particular cooking event, e.g. the cooking event labelled II in FIG. 2, to ensure that the meat product 1 is cooked to a desired degree. The defined period of time may be a user-defined period of time. For example, the kitchen appliance 10 may have a user interface (not shown), with the controller 17 being responsive to the user interface. A user may specify the desired period of time through the user interface in order to specify to which degree the meat product 1 should be cooked, e.g. blue, rare, medium rare, medium, well done, and so on. For example, the user interface may include a lookup table or the like in which a user-specified cooking degree is linked to a defined period of time for which the meat product 1 should be cooked after the detection of the particular cooking event, with the user interface adapted to configure the controller 17 to disable the heating element 11 after the defined period of time associated with the degree of cooking specified by the user on the user interface.

At this point, it is noted that the controller 17 may be implemented in any suitable manner. The controller 17 may be implemented using one or more dedicated hardware devices, e.g. application-specific integrated circuits, microcontrollers order like, or may be implemented at least in part in software on a general-purpose processor arrangement within the kitchen appliance 10. Other suitable implementations will be immediately apparent to the skilled person in the art.

Figure 4:
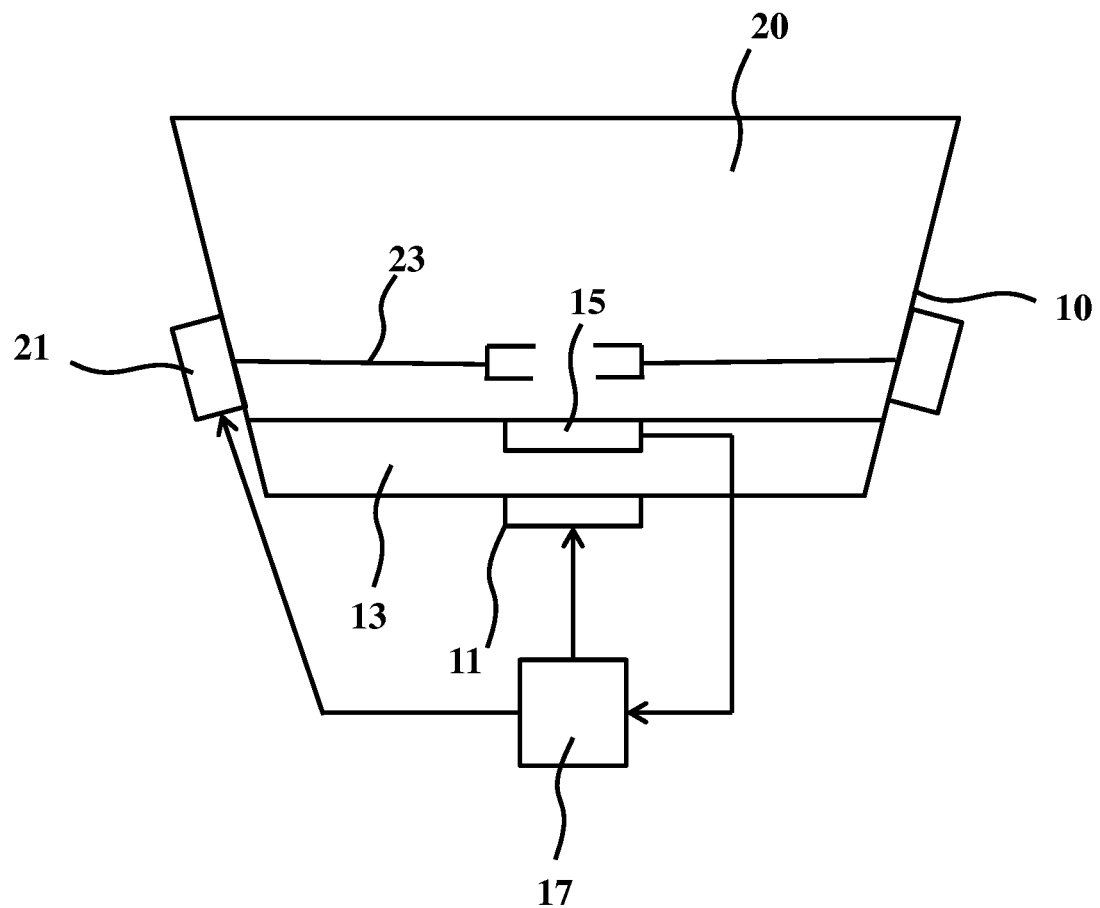
FIG. 4 schematically depicts a kitchen appliance according to another embodiment.

FIG. 4 schematically depicts an alternative embodiment of the kitchen appliance 10 in which the kitchen appliance 10 further comprises a rotatable holding device for automatically flipping (rotating) the meat product 1 in response to the controller 17 generating the control signal indicative of the meat product 1 reaching a defined cooking state, e.g. the cooking state labelled II in FIG. 2. The rotatable holding device may comprise a motor 21 coupled to a rotatable meat holding implement such as a spear 23 or the like, which spear 23 may have one or more sharp end portions, e.g. teeth or the like, for inserting into the meat product 1. Other suitable embodiments of such a rotatable meat holding implement, e.g. a clamp-like device and so on, will be immediately apparent to the skilled person.

The motor 21 may be adapted to impart a combined translation and rotation motion onto the spear 23. The translation motion may cause the meat product 1 to be lifted up and away from the solid cooking surface and may be followed by a rotation motion of the spear 23 around its axis causing the meat product 1 to be rotated around the defined angle, e.g. 180°, after which a further translation motion may cause the rotated meat product 1 to be placed on the solid cooking surface again. In an embodiment, the spear 23 may comprise opposing spear portions, with each spear portion being coupled to a respective motor 21, with the respective motors 21 being configured to operate in a synchronised manner as will be readily understood by the skilled person. The provision of a kitchen appliance 10 including a rotatable holding device under control of the controller 17 facilitates the automatic flipping of the meat product 1 at the appropriate point in time as detected by the controller 17 as previously explained, thereby further reducing the risk of suboptimal cooking, e.g. overcooking, of the meat product 1.

In the kitchen appliance schematically depicted in FIG. 4, the rotatable holding device has replaced the sensory output device 19 although it should be understood that it is equally feasible that the kitchen appliance 10 comprises both the rotatable holding device and the sensory output device 19, in which both devices may be controlled by a control signal generated by the controller 17.

Figure 5:
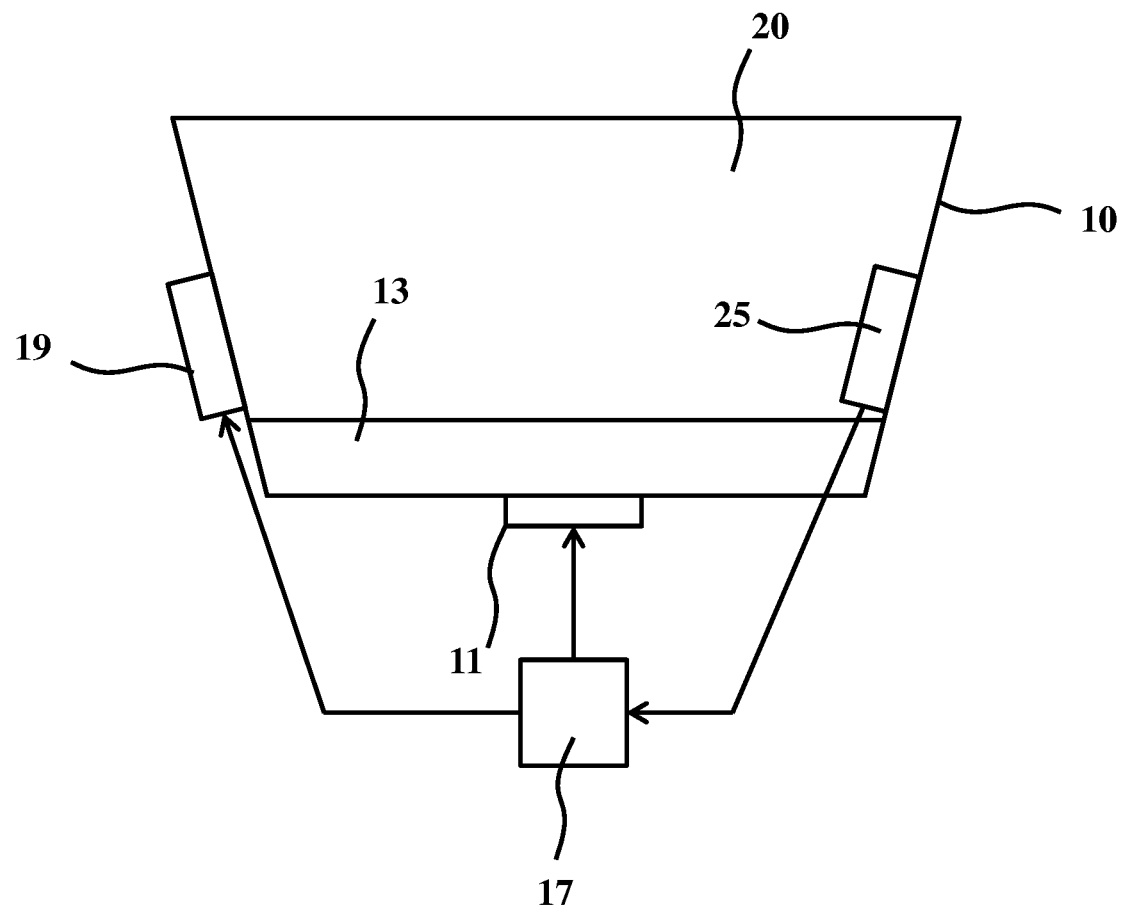
FIG. 5 schematically depicts a kitchen appliance according to yet another embodiment.

FIG. 5 schematically depicts a further embodiment of the kitchen appliance 10 in which the temperature sensor 15 has been replaced by a sound sensor 25. In this embodiment, the controller 17 is coupled to the sound sensor 25 such that the controller 17 is adapted to process a sensor signal produced by the sound sensor 25 to determine a sound produced by the cooking of the meat product 1, typically a sound associated with the loss of water from the desiccation zone 2 of the meat product 1 as previously explained. To this end, the sound sensor 25 is typically located in the vicinity of a contact surface of the meat product 1 with the medium 13, e.g. a solid cooking surface of the kitchen appliance 10. For example, the sound sensor 25 may be located on a sidewall of the compartment 20 of the kitchen appliance 10 in the vicinity of the solid cooking surface.

Upon contact of the meat product 1 with a hot solid cooking surface, the meat product 1 will typically produce a characteristic sound signature, i.e. a sizzling sound, indicative of the release of water from the desiccation zone 2 of the meat product 1. During the cooking of the meat product 1, this characteristic sound signature may change, e.g. reduce in intensity, as the amount of water in the desiccation zone 2 of the meat product 1 is reduced. Therefore, the controller 17 may be adapted to compare a sound signature in a sensor signal produced by the sound sensor 25 with a defined sound signature and to generate the control signal (and the further control signal) if the sound signature of the sensor signal matches the defined sound signature. For example, the controller 17 may compare an intensity level of the detected characteristic sound signature with a defined intensity level to determine if the detected intensity level has dropped below a defined threshold indicative of the amounts of water released from the desiccation zone 2 of the meat product 1 corresponding to a particular event during the cooking of the meat product 1 such as the cooking event labelled II in FIG. 2. In this manner, the sensory output device 19, the rotatable holding device and/or the heating element 11 may be controlled by a control signal generated by the controller 17 in response to a particular sound signature detected in the sensor signals produced by the sound sensor 25.

Figure 6:
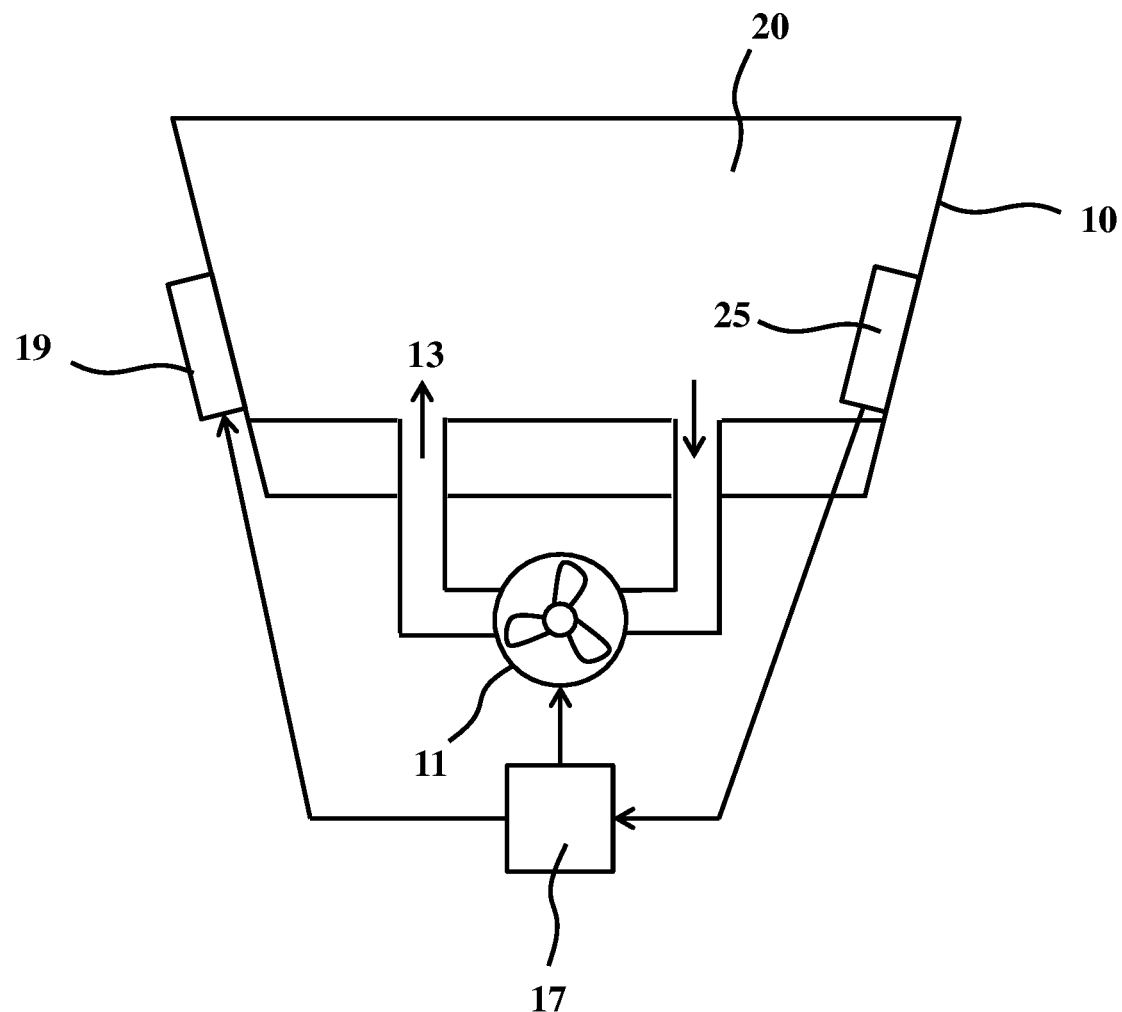
FIG. 6 schematically depicts a kitchen appliance according to yet another embodiment.

FIG. 6 schematically depicts another embodiment of the kitchen appliance 10 in which the heating element 11 is arranged to cook the meat product 1 by heating a fluid medium 13 such as air and circulating the heated air through the compartment 20. For example, heating element 11 may comprise a fan including a heater and having an inlet and outlet spatially separated from each other, which inlet and outlet are in fluid communication with the compartment 20. Although not explicitly shown in FIG. 6, the compartment 20 may further comprise a holder for the meat product 1, which holder is typically dimensioned such that the fluid medium 13 can circulate around the meat product 1. In a preferred embodiment, the holder comprises an open solid surface, i.e. a surface comprising a plurality of apertures through which the meat product 1 supported on the solid surface may be directly exposed to the fluid medium 13. The open solid surface for instance may form part of a grill onto which the meat product 1 may be placed. The holder may form an integral part of the compartment 20 or may instead be removed from the compartment 20 to facilitate cleaning of the holder.

In FIG. 6, the controller 17 is responsive to a sound sensor 25 by way of non-limiting examples only. It is equally feasible that in this embodiment the controller 17 is instead responsive to a temperature sensor 15 as previously explained, which temperature sensor 15 preferably is located such that the temperature sensor 15 can detect the temperature of the medium 13 or of the solid surface of the holder onto which the meat product 1 may be placed. In an embodiment, the temperature sensor 15 is integrated in the holder, in which case the holder may form an integral part of the compartment 20, e.g. may be the bottom surface of the compartment 20. In this embodiment, the holder may transfer the heat provided by the medium 13 to the meat product 1, with a sudden increase in the temperature of the holder indicative of the loss of water from the desiccation zone 2 of the meat product 1 as previously explained.

The kitchen appliance 10 of the present invention may be any suitable type of kitchen appliance in which a meat product 1 may be cooked, e.g. fried, griddled or grilled. For example, the kitchen appliance 10 may be one of a frying apparatus, a grill, an air frying apparatus, an oven and a multi-cooker although other embodiments will be immediately apparent to the skilled person.

Figure 7:
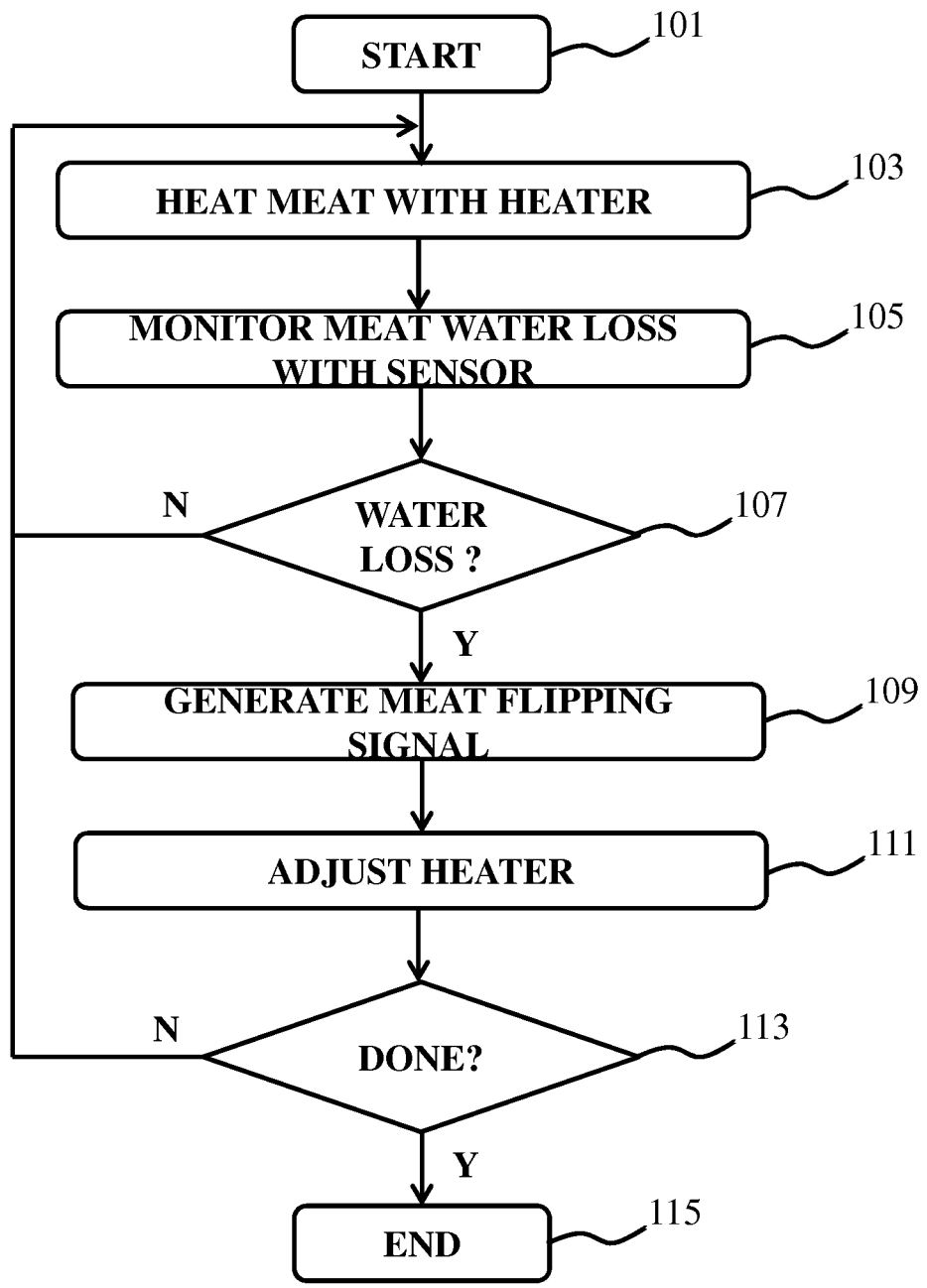
FIG. 7 is a flowchart of a method of monitoring a meat cooking process in a kitchen appliance according to an embodiment.

FIG. 7 is a flowchart of a method 100 of monitoring the cooking of a meat product 1, which monitoring method 100 for example may be implemented by the kitchen appliance 10. The method 100 starts in 101, for example by preheating a medium 13 such as a contact surface of a kitchen appliance with a meat product 1 to be cooked, and by placing the meat product 1 to be cooked onto the contact surface once it has reached a desired temperature.

The method 100 then proceeds to 103 in which the medium 13 is heated whilst being in thermal contact with the meat product 1 such that heat is transferred from the medium 13 to the meat product 1. During this heat transfer process, the method 100 generates a sensor signal in 105 with a sensor arranged to detect loss of water from a contact surface of the meat product 1 with the medium 13, such as a temperature sensor 15 or a sound sensor 25 as explained in more detail above.

The method 100 processes the sensor signal in 107 to determine if the sensor signal is indicative of the meat product 1 reaching a defined cooking state as signalled by a characteristic loss of water from the contact surface of the meat product 1 with the medium 13. In an embodiment, the processing of the sensor signal in 107 may comprise the detection of a sudden increase in the temperature, the detection of a sudden acceleration in the rate of temperature increase and/or the detection of a critical temperature of the contact surface of the meat product 1 with the medium 13. In an alternative embodiment, the processing of the sensor signal in 107 may comprise the detection of a particular sound signature in a sensor signal produced by the sound sensor 25. For the avoidance of doubt, it is reiterated that the contact surface may form part of the medium 13, e.g. may be a solid cooking surface directly or indirectly heated by a heating element 11.

If it is determined in 107 that the meat product 1 has not yet reached the defined cooking state, the method 100 may revert back to 103. Otherwise, the method 100 may proceed to 109 in which one or more control signals indicative of the meat product reaching a defined cooking state in response to the processed sensor signal being indicative of the loss of water associated with said defined cooking state from the contact surface of the meat product is generated.

For example, in 109 a control signal may be generated to control a sensory output device in order to inform a user of a kitchen appliance 10 implementing the method 100 that the meat product 1 has reached the defined cooking state, which for instance may prompt the user to flip the meat product 1 in the kitchen appliance 10 and/or adjust the settings of the kitchen appliance 10 to finalise the cooking process. Alternatively or additionally, in 109 a control signal may be generated to control a rotatable holding device in the kitchen appliance 10 in order to automatically flip the meat product 1 as previously explained.

Optionally, a further control signal may be generated in 109 to control the heating element 11, for example to reduce the heating of the meat product 1, e.g. by temporarily disabling the heating element 11 or by reducing a heating level of the heating element 11, and/or to disable the heating element 11 after a predefined period of time following the detection of the meat product 1 having reached the defined cooking state in order to ensure that the meat product 1 is cooked in a desired manner as previously explained. In this embodiment, the method may further proceed to 111 in which the heating element 11 is adjusted using this further control signal. Alternatively, step 111 may be omitted from the method 100.

Next, it is checked in 113 if the cooking process has completed. If it is decided that this is not the case, the method 100 may revert back to a previous step such as step 103 by way of non-limiting example, otherwise, the method 100 may terminate in 115.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A kitchen appliance for cooking a meat product, the kitchen appliance comprising:
    a heating element adapted to heat a medium for transferring heat to the meat product;
    a sensor for detecting loss of water from a contact surface of the meat product with the medium; and
    a controller conductively coupled to the sensor and adapted to:
    process a sensor signal produced by the sensor; and
    generate a control signal indicative of the meat product's reaching a defined cooking state in response to the processed sensor signal's being indicative of a loss of water associated with the defined cooking state from the contact surface of the meat product.

2. The kitchen appliance of claim 1, further comprising a sensory output device, wherein the controller is adapted to control the sensory output device with the control signal, said control signal causing the sensory output device to generate a warning signal.

3. The kitchen appliance of claim 2, wherein the sensory output device is at least one of a display device, a light emitting diode, and a loudspeaker.

4. The kitchen appliance of claim 1, further comprising a rotatable holding device for holding the meat product, wherein the controller is adapted to control the rotatable holding device with the control signal to cause a rotation of the meat product.

5. The kitchen appliance of claim 1, wherein the sensor is a temperature sensor arranged to contact the contact surface of the meat product with the medium.

6. The kitchen appliance of claim 5, wherein the controller is adapted to determine a rate of temperature change from a series of sensor signals produced by the temperature sensor and to generate the control signal when said rate of temperature change exceeds a defined threshold.

7. The kitchen appliance of claim 5, wherein the controller is adapted to compare a temperature derived from a sensor signal produced by the temperature sensor with a defined temperature and to generate the control signal when said temperature derived from the sensor signal at least matches the defined temperature.

8. The kitchen appliance of claim 1, wherein the sensor is a sound sensor in a vicinity of the medium.

9. The kitchen appliance of claim 8, wherein the controller is adapted to compare a sound signature of a sensor signal produced by the sound sensor with a defined sound signature and to generate the control signal when the sound signature of the sensor signal matches the defined sound signature.

10. The kitchen appliance of claim 1, wherein the controller is adapted to control the heating element in response to the processed sensor signal being indicative of the loss of water associated with the defined cooking state from the contact surface of the meat product.

11. The kitchen appliance of claim 10, wherein the controller is adapted to control the heating element such as to reduce a temperature of a heat transfer surface in response to the processed sensor signal being indicative of the loss of water associated with the defined cooking state from the contact surface of the meat product.

12. The kitchen appliance of claim 10, wherein the controller is adapted to switch off the heating element after a determined amount of time in response to the processed sensor signal indicative of the loss of water associated with the defined cooking state from the contact surface of the meat product.

13. The kitchen appliance of claim 1, wherein the medium is at least one of a heat transfer surface in contact with the heating element or air heated by the heating element.

14. The kitchen appliance of claim 1, wherein the kitchen appliance is one of a frying apparatus, a grill, an air frying apparatus, an oven, and a multi-cooker.

15. The kitchen appliance of claim 1, wherein the heating element is adapted to heat the medium to a temperature of approximately 300° C.

* * * * *